(12) United States Patent
Garcia-Luna-Aceves et al.

(10) Patent No.: US 6,836,463 B2
(45) Date of Patent: *Dec. 28, 2004

(54) SYSTEM FOR COMMUNICATING LABELED ROUTING TREES TO ESTABLISH PREFERRED PATHS AND SOURCE ROUTES WITH LOCAL IDENTIFIERS IN WIRELESS COMPUTER NETWORKS

(75) Inventors: J. Joaquin Garcia-Luna-Aceves, San Mateo, CA (US); Marcelo Spohn, Santa Cruz, CA (US); David A. Beyer, Los Altos, CA (US)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/418,700

(22) Filed: Oct. 15, 1999

(65) Prior Publication Data

US 2003/0165117 A1 Sep. 4, 2003

(51) Int. Cl.$^7$ .......................... G01R 31/08; H04L 12/28; H04Q 7/24; G06F 15/173
(52) U.S. Cl. ...................... 370/238; 370/338; 370/351; 370/256; 709/241; 709/242
(58) Field of Search ................................ 370/351, 352, 370/238, 468, 400, 255, 407, 408, 235, 230, 231, 389, 392, 395.21, 395.31, 395.42, 395, 252, 256; 709/232, 238, 241, 242

(56) References Cited

U.S. PATENT DOCUMENTS 4,466,060 A   8/1984 Riddle
4,987,536 A   1/1991 Humblet (List continued on next page.)

FOREIGN PATENT DOCUMENTS

| EP | 0465201 A2 | 1/1992 |
|---|---|---|
| EP | 0539737 A1 | 5/1993 |
| EP | 0841763 A1 | 5/1998 |
| GB | 2313254 A | 11/1997 |
| WO | 96/19887 A | 6/1996 |
| WO | 99/46899 A2 | 9/1999 |
| WO | 00/39967 A2 | 7/2000 |

OTHER PUBLICATIONS

G. Markowsky and F.H. Moss, "An Evaluation of Local Path ID Swapping in Computer Networks," IEEE Trans. Commun., vol. COM–29, pp. 329–336 (Mar. 1981).

(List continued on next page.)

Primary Examiner—Hanh Nguyen
(74) Attorney, Agent, or Firm—Squire, Sanders & Dempsey L.L.P.

(57) ABSTRACT

One or more labeled routing trees (LRTS) are produced at a router of a computer network according to a shortest path determination made over a partial topology graph of the network, which graph is produced according to knowledge of adjacent links of the router and one or more LRTs of neighboring routers. The LRTs of the router may be updated in response to receipt of routing state update messages, and such messages may include local link identifiers assigned by a head of a link to which the identifiers pertain, and node parameters of a tail of the link to which the local link identifiers pertain. The routing state update messages may be transmitted within the network: (i) in response to a new destination node being detected by an existing node within the network, (ii) in response to a destination becoming unreachable by a collection of the existing nodes, (iii) in response to the change in the cost of a path to at least one destination exceeding a threshold and/or (iv) in situations where a routing loop may be encountered among two or more of the nodes of the network (e.g., at times when a path implied in the LRT of the router leads to a loop).

9 Claims, 4 Drawing Sheets

U.S. PATENT DOCUMENTS

| | | | |
|---|---|---|---|
| 5,115,433 A | | 5/1992 | Baran et al. |
| 5,231,634 A | | 7/1993 | Giles et al. |
| 5,233,604 A | * | 8/1993 | Ahmadi et al. ............. 370/238 |
| 5,487,064 A | | 1/1996 | Galand et al. |
| 5,509,123 A | | 4/1996 | Dobbins et al. |
| 5,515,508 A | | 5/1996 | Pettus et al. |
| 5,548,578 A | | 8/1996 | Matsune et al. |
| 5,557,748 A | | 9/1996 | Norris |
| 5,572,528 A | | 11/1996 | Shuen |
| 5,596,719 A | * | 1/1997 | Ramakrishnan et al. .... 370/238 |
| 5,600,644 A | | 2/1997 | Chang et al. |
| 5,608,721 A | * | 3/1997 | Natarajan et al. ........... 370/238 |
| 5,633,866 A | * | 5/1997 | Callon ........................ 370/397 |
| 5,638,371 A | | 6/1997 | Raychaudhuri et al. |
| 5,652,751 A | | 7/1997 | Sharony |
| 5,682,382 A | | 10/1997 | Shepard |
| 5,706,291 A | | 1/1998 | Kainulainen et al. |
| 5,721,725 A | | 2/1998 | Want et al. |
| 5,721,819 A | | 2/1998 | Galles et al. |
| 5,737,318 A | | 4/1998 | Melnik |
| 5,805,593 A | | 9/1998 | Busche |
| 5,845,086 A | | 12/1998 | Doebrich et al. |
| 5,854,899 A | | 12/1998 | Callon et al. |
| 5,881,246 A | | 3/1999 | Crawley et al. |
| 5,896,379 A | | 4/1999 | Haber |
| 5,918,016 A | | 6/1999 | Brewer et al. |
| 5,926,463 A | | 7/1999 | Ahearn et al. |
| 5,933,425 A | * | 8/1999 | Iwata ......................... 370/351 |
| 5,964,841 A | | 10/1999 | Rekhter |
| 5,999,536 A | | 12/1999 | Kawafuji et al. |
| 6,006,272 A | | 12/1999 | Aravamudan et al. |
| 6,026,303 A | | 2/2000 | Minamisawa |
| 6,108,314 A | | 8/2000 | Jones et al. |
| 6,246,669 B1 | * | 6/2001 | Chevalier et al. ........... 370/238 |
| 6,301,244 B1 | * | 10/2001 | Huang et al. ................ 370/351 |

OTHER PUBLICATIONS

J. Moy, "OSPF Version 2," RFC 1583, Network Working Group (Mar. 1994).

P. Newman, T. Lyon, and G. Minshall, "Flow Labeled IP: A Connectionless Approach to ATM," Proc. IEEE Infocom '96, San Francisco, CA, pp. 1251–1260 (Mar. 1996).

Yakov Rekhter, et al., "Tag Switching Architecture Overview," Proc. IEEE, vol. 85, No. 12 (Dec. 1997).

M. Schwartz and T. Stern, "Routing Techniques Used in Computer Communications Networks," IEEE Transactions on Communications, vol. COM–28, No. 4, pp. 539–552 (Apr. 1980).

A. Segall and J. Jaffe, "Route Setup with Local Identifiers," IEEE Trans. Commun., vol. COM–34, pp. 45–53 (Jan. 1986).

J.J. Garcia–Luna–Aceves, et al., "Wireless Internet Gateways (WINGS)," Annual Military Communications Conference, New York, New York, XP–000792611, IEEE pp. 1271–1276 (Nov. 3, 1997).

B. Rajagopalan, et al., "A Responsive Distributed Algorithm for Shortest–Path Routing Within Autonomous Systems," Internetworking: Research and Experience, XP–000669932 John Wiley & Sons, vol. 2, No. 1 pp. 51–69 (Mar. 1991).

J.J. Garcia–Luna–Aceves and Marcelo Spohn, "Efficient Routing in Packet–Radio Networks Using Link–State Information," 1999 IEEE Wireless Communications and Networking Conference, XP–002168435, vol. 3, pp. 1308–1312 (Sep. 24, 1999).

V.O.K. Li and R. Chang, "Proposed Routing Algorithms for the US Army Mobile Subscriber Equipment (MSE) network," Proceedings IEEE MILCOM '86, Monterey, CA (Oct. 1986).

C. Perkins, "Ad Hoc On Demand Distance Vector (AODV) Routing," draft–ietf–manet.aodv–00.txt (Nov. 1997).

C.K. Toh, "Wireless ATM & Ad Hoc Networks: Protocols and Architectures," Chapter 9, pp. 193–227 and 293–307, Kluwer Academic Publishers (1997).

R.M. Metcalfe and D.R. Boggs, "Ethernet: Distributed packet switching for local computer networks," Communications of the ACM, vol. 19, No. 7, pp. 395–403 (1976).

F.A. Tobagi and L. Kleinrock, "Packet switching in radio channels: Part III—polling and (dynamic) split–channel reservation multiple access," IEEE Trans. Commun., vol. COM–24, No. 8, pp. 832–845 (1976).

P. Karn, "MACA—a new channel access method for packet radio," in ARRL/CRRL Amateur Radio 9th Computer Networking Conference, pp. 134–140, ARRL (Apr. 1990).

C.L. Fullmer and J.J. Garcia–Luna–Acheves, "Solutions to Hidden Terminal Problems in Wireless Networks," Proceedings of ACM SIGCOMM '97, Cannes, France (Sep. 14–18, 1997).

V. Bharghavan, A. Demers, S. Shenker, and L. Zhang, "MACAW: A Media Access Protocol for Wireless LAN's," Proceedings of ACM Sigcomm '94, London, UK, pp. 212–225 (Aug. 31–Sep. 2, 1994).

Ji–Her Ju and Victor O.K. Li, "An Optimal Topology–Transparent Scheduling Method in Multihop Packet Radio Networks," IEEE/ACM Transactions on Networking, vol. 6, No. 3, pp. 298–306 (Jun. 1998).

Chenxi Zhu and M.S. Corson, "A Five–Phase Reservation Protocol (FPRP) for Mobile AD Hoc Networks," Proceedings of IEEE INFOCOM '98.

Z. Tang and J.J. Garcia–Luna–Acheves, "Hop Reservation Multiple Access (HRMA) for Multichannel Packet Radio Networks," Proceedings of IEEE IC3N '98: Seventh International Conference on Computer Communication Networks, Lafayette, Louisiana (Oct. 12–15, 1998).

I. Chlamtac and A. Lerner, "Fair Alrogrithms for Maximal Link Activation in Multihop Radio Networks," IEEE Transactions on Communications, vol. COM–35, No. 7 (Jul. 1987).

J. Haartsen, et al., "Bluetooth: Vision, Goals, and Architecture," Mobile Computing and Communications Review, XP–0007854002, US, ACM, New York, NY, vol. 2, No. 4, pp. 38–45 (Oct. 1, 1998).

L. Kleinrock and F.A. Tobagi, "Packet Switching in Radio Channels: Part 1—Carrier Sense Multiple Access Modes and Their Throughput–Delay Characteristics," IEEE Trans. Comm., vol. COM–23, No. 12, pp. 1400–1416 (1975).

Barry M. Leiner, Donald L. Nielson, and Fouad A. Tobagi, "Issues in Packet Radio Network Design," Proceedings of the IEEE, vol. 75, No. 1, pp. 6–20 (Jan. 1987).

David B. Johnson and David M. Maltz, "Protocols for Adaptive Wireless and Mobile Networking," IEEE Pers. Commun., vol. 3, No. 1 (Feb. 1996).

V. Park and M. Corson, "A Highly Adaptive Distributed Routing Algorithm for Mobile Networking," IEEE INFOCOMM '97, Kobe, Japan (Apr. 1997).

Rohit Dube, et al., "Signal Stability–Based Adaptive Routing (SSA) for Ad Hoc Mobile Networks," IEEE Pers. Commun., vol. 4, No. 1, pp. 36–45 (Feb. 1997).

Zygmunt J. Hass and Marc R. Pearlman, "The Performance of Query Control Schemes for the Zone Routing Protocol," Proc. ACM SIGCOMM '98, Vancouver, British Columbia (Aug. 1998).

J. Broch, et al., "A Performance Comparison of Multi–Hop Wireless Ad Hoc Networking Routing Protocols," Proc. ACM MOBICOMM '98, Dallas, Texas (Oct. 1998).

J. Jubin and J. Tornow, "The DARPA Packet Radio Network Protocols," Proceedings of the IEEE, vol. 75, No. 1, pp. 21–32 (Jan. 1987).

C. Perkins and P. Bhagwat, "Highly Dynamic Destination–Sequenced Distance–Vector Routing (DSDV) for Mobile Computers," Proc. ACM SIGCOMM '94, London, UK (Oct. 1994).

S. Murthy and J.J. Garcia–Luna–Aceves, "An Efficient Routing Protocol for Wireless Networks," ACM Mobile Networks and Applications Journal, Special issue on Routing in Mobile Communication Networks (1996).

J.J. Garcia–Luna–Aceves, et al., "Wireless Internet Gateways (WINGS)," Proc. IEEE MILCOM '97, Monterey, California (Nov. 1997).

M. Pursley and H.B. Russell, "Routing in Frequency–Hop Packet Radio Networks with Partial–Band Jamming," IEEE Trans. Commun., vol. 41, No. 7, pp. 1117–1124 (1993).

R. Ramanathan and M. Steenstrup, "Heirarchically–organized, Multihop Mobile Wireless Networks for Quality–of–Service Support," ACM Mobile Networks and Applications, vol. 3, No. 1, pp. 101–119 (1998).

C.V. Ramamoorthy and W. Tsai, "An Adaptive Heirarchical Routing Algorithm," Proceedings of IEEE COMPSAC '83, Chicago, Illinois, pp. 93–104 (Nov. 1993).

M. Steenstrup, "Routing in Communications Networks," Chapter 11, pp. 351–389 and 390–396, Prentice–Hall (1995).

J.J. Garcia–Luna–Aceves and J. Behrens, "Distributed, scalable routing based on vectors of link states," IEEE Journal on Selected Areas in Communications, vol. 13, No. 8 (1995).

J.J. Garcia–Luna Aceves and M. Spohn, "Scalable Link–State Internet Routing," Proc. IEEE International Conference on Network Protocols, (ICNP '98), Austin, Texas (Oct. 14–16, 1998).

P.A. Humblet, "Another Adaptive Shortest–Path Algorithm," IEEE Trans. On Commun., vol. 39, No. 6, pp. 995–1003 (Jun. 1991).

C. Cheng, R. Reley, S.P.R. Kumar, and J.J. Garcia–LunA–Aceves,"A Loop–Free Extended Bellman–Ford Routing Protocol without Bouncing Effect," Proc. ACM SIGCOMM '89, pp. 224–236.

S. Murthy and J.J. Garcia–Luna–Aceves, "Loop–Free Internet Routing Using Heirarchical Routing Trees," Proc. IEEE INFOCOMM '97, Kobe, Japan (Apr. 7–11, 1997).

L. Kleinrock and F. Kamoun, "Hierarchical Routing for Large Networks: Performance Evaluation and Optimization," Computer Networks, vol. 1, pp. 155–174 (1977).

J. Behrens and J.J. Garcia–Luna–Aceves, "Hierarchical Routing Using Link Vectors," Proc. IEEE INFOCOMM '98, San Francisco, California (Mar. 29–Apr. 2, 1998).

D. Bersekas and R. Gallager, "Data Networks: Second Edition," Chapters 4 and 5, pp. 271–492 and 537–551, Prentice–Hall, Inc. (1992).

J. Broch, et al., "The Dynamic Source Routing Protocol for Mobile Ad Hoc Networks," draft–ietf–manet–dsr–01.txt (Dec. 1998).

Matta, Ibrahim and Shankar, A. Udaya, "Type–of–Service Routing in Datagram Delivery Systems," Proceedings of the Conference on Computer Communications IEEE, Issue 3 (1994), 15 pages.

* cited by examiner

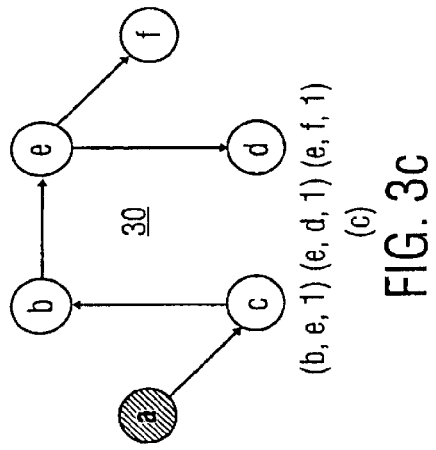
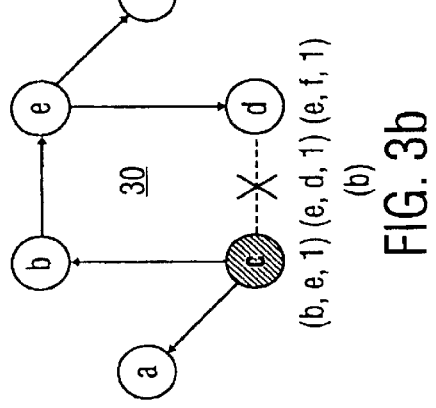
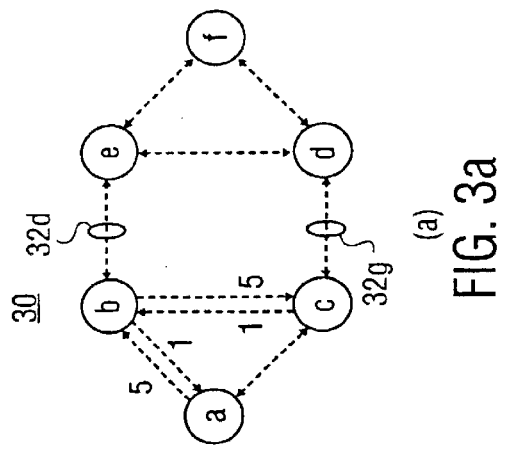
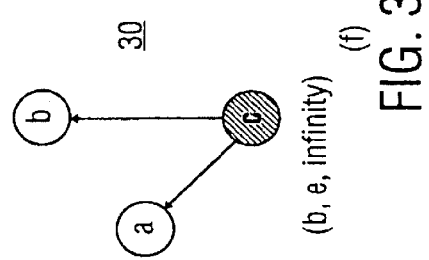
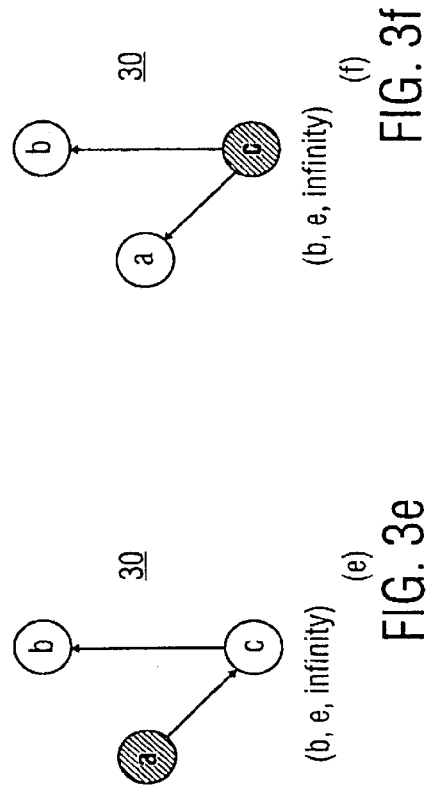
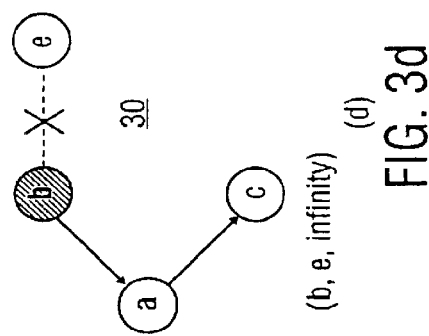
FIG. 3a  FIG. 3b  FIG. 3c
FIG. 3d  FIG. 3e  FIG. 3f

SYSTEM FOR COMMUNICATING LABELED ROUTING TREES TO ESTABLISH PREFERRED PATHS AND SOURCE ROUTES WITH LOCAL IDENTIFIERS IN WIRELESS COMPUTER NETWORKS

STATEMENT OF GOVERNMENT LICENSE RIGHTS

The United States Government has a paid-up license in portions of this invention and the right in limited circumstances to require the patent owner to license others on reasonable terms as provided for by the terms of Contract No.: DAAH01-98-C-R005, awarded by the U.S. Army Aviation & Missile Command.

FIELD OF THE INVENTION

The present invention relates to routing protocols in computer networks, and more particularly, routing protocols in ad hoc networks with radio links.

BACKGROUND

Multi-hop packet-radio networks, or ad hoc networks, consist of mobile hosts interconnected by routers that can also move. The deployment of such routers is ad hoc and the topology of such networks is very dynamic, because of host and router mobility, signal loss and interference, and power outages. In addition, the channel bandwidth available in ad hoc networks is relatively limited compared to wired networks, and untethered routers may need to operate with battery-life constraints. In these networks, routing must preferably be accomplished using as few a number of control messages and neighbor-to-neighbor handshakes as possible, in order to conserve channel bandwidth for user data and preserve the battery life of untethered nodes. Because of the dynamics of the topology in an ad hoc network, broadcast radio links are preferable for interconnecting routers without the need for topology planning.

Routing protocols for computer networks can be categorized according to: (a) the type of information the protocols use to compute preferred paths, and (b) the way in which routers obtain routing information. In terms of the type of information used by routing protocols, routing protocols can be classified into link-state protocols and distance-vector protocols. Routers running a link-state protocol use topology information to make routing decisions; routers running a distance-vector protocol use distances and, in some cases, path information, to destinations to make routing decisions.

In terms of the way in which routers obtain information, routing protocols have been classified as either table-driven or on-demand. In an on-demand routing protocol, routers maintain path information for only those destinations that they need to contact as a source or relay of information. The basic approach consists of allowing a router that does not know how to reach a destination to send a flood-search message to obtain the path information it needs. One of the first routing protocols of this type was proposed to establish virtual circuits in the MSE network, see V. O. K. Li and R. Chang, "Proposed routing algorithms for the US Army mobile subscriber equipment (MSE) network," Proc. IEEE MILCOM'86, Monterey, Calif., October 1986, and there are several other, recent examples of this approach (e.g., AODV, see C. Perkins, "Ad Hoc On Demand Distance Vector (AODV) Routing," draft-ietf-manet-aodv-00.txt, November 1997; ABR, see C-K. Toh, "Wireless ATM & Ad Hoc Networks," Kluwer, November 1996; DSR, see D. Johnson and D. Maltz, "Protocols for Adaptive Wireless and Mobile Networking," IEEE Pers. Commun., Vol. 3, No. 1, February 1996; TORA, see V. Park and M. Corson, "A Highly Adaptive Distributed Routing Algorithm for Mobile Wireless Networks,"' Proc. IEEE INFOCOM 97, Kobe, Japan, April 1997; SSA, see R. Dube et al., "Signal Stability-Based Adaptive Routing (SSA) for Ad Hoc Mobile Networks," IEEE Pers. Commun., February 1997; and ZRP, see Z. Haas and M. Pearlman, "The Zone Routing Protocol for Highly Reconfigurable Ad Hoc Networks," Proc. ACM SIGCOMM 98, Vancouver, British Columbia, August 1998). The Dynamic Source Routing (DSR) protocol has been shown to outperform many other on-demand routing protocols. J. Broch et al, "A Performance Comparison of Multi-Hop Wireless Ad Hoc Network Routing Protocols," Proc. ACM MOBICOM 98, Dallas, Tex., October 1998. The existing on-demand routing protocols differ on the specific mechanisms used to disseminate flood-search packets and the responses thereto, the means used to cache information received during other nodes' searches, and the manner in which to determine the cost of a link and the existence of a neighbor. However, one common characteristic of all of the on-demand routing protocols reported to date is that such protocols are based on distances to destinations. Stated differently, there have been no on-demand link-state routing protocol proposals to date.

In a table-driven scheme, each router maintains path information for each known destination in the network and updates its routing-table entries as needed. Examples of table-driven algorithms based on distance vectors are the routing protocol of the DARPA packet-radio network, J. Jubin and J. Tornow, "The DARPA Packet Radio Network Protocols," Proceedings of the IEEE, Vol. 75, No. 1, January 1987; DSDV, C. Perkins and P. Bhagwat, "Highly Dynamic Destination-Sequenced Distance-Vector Routing (DSDV) for Mobile Computers," Proc. ACM SIGCOMM 94, London, UK, October 1994; WRP, S. Murthy and J. J. Garcia-Luna-Aceves, "An Efficient Routing Protocol for Wireless Networks," ACM Mobile Networks and Applications Journal, Special issue on Routing in Mobile Communication Networks, 1996; WIRP, J. J. Garcia-Luna-Aceves et al., "Wireless Internet Gateways (WINGS)," Proc. IEEE MILCOM'97, Monterey, Calif., November 1997; and least-resistance routing protocols, M Pursley and H. B. Russell, "Routing in Frequency-Hop Packet Radio Networks with Partial-Band Jamming," IEEE Trans. Commun., Vol. 41, No. 7, pp. 1117–1124, 1993.

Prior table-driven approaches to link-state routing in packet-radio networks are based on topology broadcasts. However, disseminating complete link-state information to all routers incurs excessive communication overhead in an ad hoc network because of the dynamics of the network and the small bandwidth available. Accordingly, all existing link-state routing approaches for packet-radio networks have been based on hierarchical routing schemes. R. Ramanathan and M. Steenstrup, "Hierarchically-organized, Multihop Mobile Wireless Networks for Quality-of-Service Support," ACM Mobile Networks and Applications, Vol.3, No. 1, pp. 101–119, 1998; C. V. Ramamoorthy and W. Tsai, "An Adaptive Hierarchical Routing Algorithm," Proceedings of IEEE COMPSAC '83, Chicago, Ill., pp. 93–104, November 1983; and M. Steenstrup (ed.), Routing in Communication Networks, Prentice-Hall, 1995. Also, prior proposals for link-state routing using partial link-state data without clusters, see, e.g., J. J. Garcia-Luna-Aceves and J. Behrens, "Distributed, scalable routing based on vectors of link states," IEEE Journal on Selected Areas in Communications, Vol. 13, No. 8, 1995; and J. J. Garcia-Luna-Aceves and M. Spohn, "Scalable Link-State Internet Routing," Proc. IEEE International Conference on Network Protocols (ICNP 98), Austin, Tex., Oct. 14–16, 1998, require routers to explicitly inform their neighbors which links they use and which links they stop using.

A number of prior routing protocols are based on the notion of routing trees, in which routers communicate either the state (i.e., cost or length) of the links in a shortest-path routing tree, or the distance from the root of the tree and the second-to-last hop in the routing tree for each node in the tree. An early example of this type of protocol was proposed in U.S. Pat. No. 4,466,060 to Riddle. In Riddle's protocol, a router communicates different routing trees to different neighbors; such trees are called "exclusionary trees" and specify the preferred paths to destinations excluding those paths that involve the router to which the update is being sent. An update packet or message specifies an entire exclusionary tree. Another protocol based on routing trees was reported by Garcia-Luna-Aceves, J. J. Garcia-Luna-Aceves, "A Fail-Safe Routing Algorithm for Multihop Packet-Radio networks," Proc. IEEE Infocom 86, Miami, Fla., April 1986, which protocol differs from Riddle's protocol in that the same routing tree is sent incrementally by a router to all its neighbors. A. Humblet, "Another Adaptive Shortest-Path Algorithm," IEEE Trans. Comm., Vol.39, No.6, June 1991, pp.995–1003 (and see U.S. Pat. No. 4,987,536); Cheng et al., C. Cheng et al., "A Loop-Free Extended Bellman-Ford Routing Protocol without Bouncing Effect", Proc. ACM SIGCOMM 89, pp.224–236; B. Rajagopalan and M. Faiman, "A Responsive Distributed Shortest-Path Routing Algorithm within Autonomous Systems," Journal of Internetworking: Research and Experience}, Vol. 2, No. 1, March 1991, pp. 51–69; and S. Murthy and J. J. Garcia-Luna-Aceves, "Loop-Free Internet Routing Using Hierarchical Routing Trees," Proc. IEEE INFOCOM 97, Kobe, Japan, Apr. 7–11, 1997, have all proposed protocols based on source trees in which a router communicates to its neighbors the same shortest-path routing tree incrementally and these latter examples differ from the above-cited protocol by Garcia-Luna-Aceves in the way in which a router obtains its own source tree from the trees reported by its neighbors. An important feature of all prior routing tree-based protocols is the fact that they are all based on communicating routing trees in terms of the lengths of the links and the identifiers of the nodes that form part of the routing trees.

SUMMARY OF THE INVENTION

In one embodiment of the present scheme, one or more labeled routing trees (LRTs) are produced at a router of a computer network according to a shortest path determination made over a partial topology graph of the network, which graph is produced according to knowledge of adjacent links of the router and one or more LRTs of neighboring routers. The LRTs of the router may be updated in response to receipt of routing state update messages, and such messages may include local link identifiers assigned by a head of a link to which the identifiers pertain, and node parameters of a tail of the link to which the local link identifiers pertain. The routing state update messages may be transmitted within the network: (i) in response to a new destination node being detected by an existing node within the network, (ii) in response to a destination becoming unreachable by a collection of the existing nodes, (iii) in response to the change in the cost of a path to at least one destination exceeding a threshold delta, and/or (iv) in situations where a routing loop may be encountered among two or more of the nodes of the network (e.g., at times when a path implied in the LRT of the router leads to a loop).

In another embodiment, the present routing protocol allows for distributing local link identifiers among nodes of a computer network within routing state update messages. These local link identifiers are preferably assigned by a head of a link to which the identifiers pertain. The routing state update messages may include state parameters for nodes at tails of links to which the identifiers pertain. The routing protocol may further provide for distributing labeled routing trees of the nodes of the computer network among the nodes, for example wherein each node of the computers network may distribute its labeled routing trees to its neighboring nodes.

In such a routing protocol each node of the computer network preferably maintains one labeled routing tree per type of service offered in the network. These labeled routing trees may be generated according to a partial topology graph derived from the node's adjacent links and labeled routing trees of neighboring nodes, for example by applying a path selection algorithm to the partial topology graph. The labeled routing trees may then be updated in response to receipt of the routing state update messages. Such updates may be made according to either an optimum routing approach or a least overhead routing approach, depending upon which approach is used within the computer network.

For the optimum routing approach, routing state update messages are preferably transmitted: (i) when a routing state update message which causes a link to be added to a subject node's labeled routing trees is received, (ii) when a more recent routing state update message regarding an existing link in the subject node's labeled routing trees is received, and/or (iii) when a destination becomes unreachable by the subject node. In the least overhead routing approach, routing state update messages may be transmitted: (i) when a subject node finds a new destination or any neighbors of the subject node report same, (ii) when a destination becomes unreachable by the subject node or any of its neighbors, (iii) when the subject node finds that the change in the cost of a path to at least one destination exceeds a threshold delta, (iv) when a path implied in any of the labeled routing trees of the subject node leads to a loop, and/or a new successor chosen to a given destination has an address larger than an address of the subject node and a reported distance from the new successor to a particular destination is larger than a reported distance from a previous successor to that particular destination. Another embodiment provides a routing update message that includes information regarding performance characteristics and addressing information for a link of a computer network and a node of the network at a tail end of the link. In some cases, the routing update may further include a time stamp assigned by a node at a head end of the link, a type of service vector, and addressing information for the node at a head end of the link. The performance characteristics preferably include link state parameters (e.g., link delay, link cost, available bandwidth, and/or reliability) of the link, while the type of service vector preferably specifies a type of service routing tree in which the link is being used by a node transmitting the routing update message. The addressing information of the link is preferably specified in the form of a local link identifier assigned to the link by the node at a head end of the link.

BRIEF DESCRIPTION OF THE DRAWINGS

The present invention is illustrated by way of example, and not limitation, in the figures of the accompanying drawings in which like reference numerals refer to similar elements and in which:

FIGS. 3a–3f illustrate an example of a six-node wireless network with routers configured in accordance with the present routing protocol and the routing state updates generated after certain link failures within the network.

DETAILED DESCRIPTION

Figure 1:
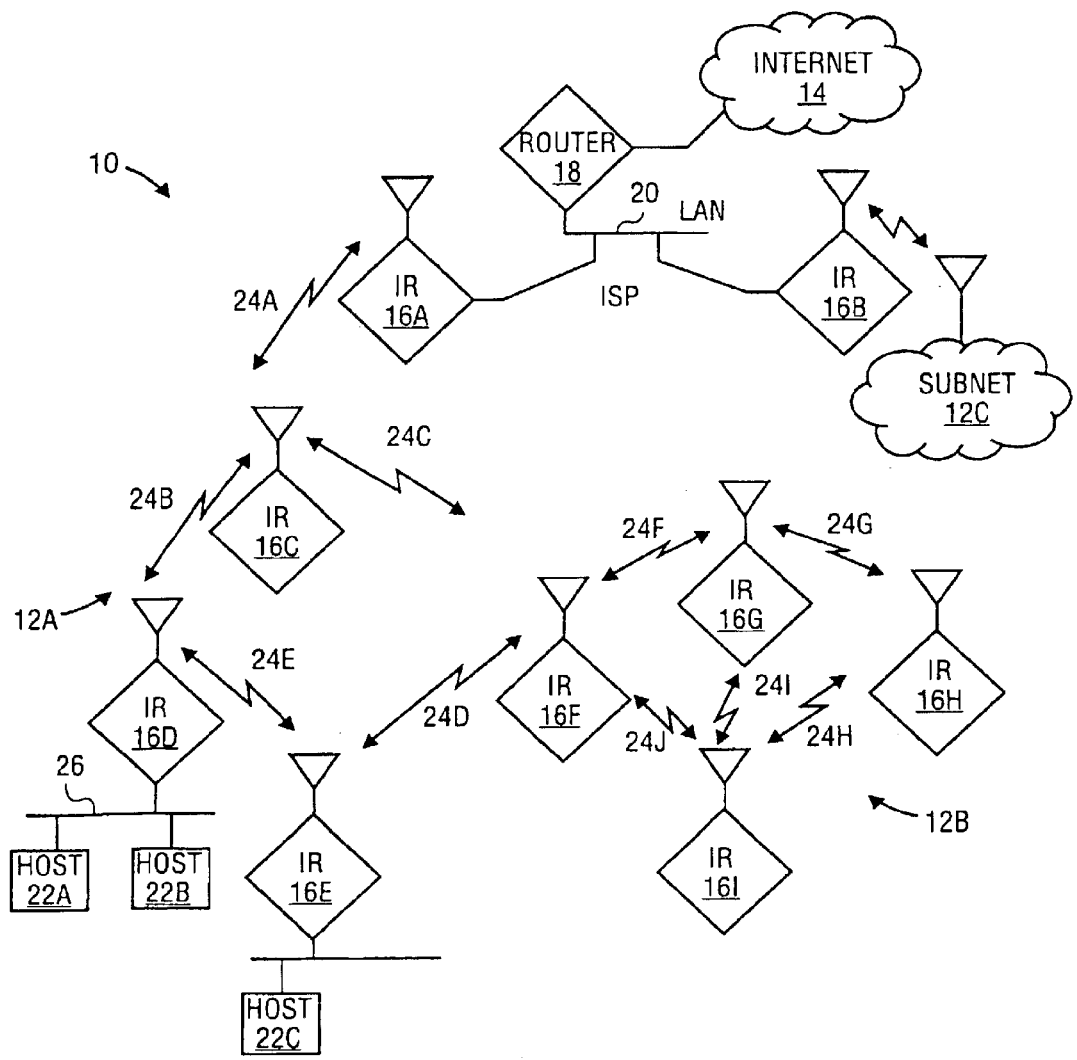
FIG. 1 illustrates an example of an ad hoc wireless network with routers configured in accordance with the present routing protocol.

A scheme for enabling routing of data packets in a computer network along preferred paths either on a hop-by-hop basis, or by specifying a source route efficiently by means of local identifiers is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope.

In the present scheme, each packet being routed carries a routing operation code (ROC) instructing the receiving router which routing method to apply to forward the packet. A packet can be forwarded in any of the following forwarding modes: (a) a conventional hop-by-hop routing mode, which uses the routing table of the router; or (b) a source-routing mode, in which the entire source route is specified in the packet using local link identifiers instead of the addresses of relay routers as is common in prior source routing approaches. These forwarding modes are enabled using the present routing protocol, termed the Adaptive Internet Routing (AIR) protocol, which allows for the dissemination of link-state information and node-state information in the form of labeled routing trees (LRTs).

With AIR, a router sends updates to its neighbors regarding the links and nodes in its preferred paths to destinations. The links and nodes along the preferred paths from a source to each desired destination constitute an LRT that implicitly specifies the complete paths from the source to each destination. Each link is labeled with a local link identifier (LLID).

Each link in an LRT is directed and has a head-of-link node and a tail-of-link node. The head of the link labels the link with an LLID that differentiates that link from all other links from the same node to other neighbors. The LLID of a link is much smaller (in terms of the number of bits required to specify the LLID) than the address of a node.

Each router maintains an LRT for each type of service defined in the network (e.g., minimum-hop, minimum delay, and maximum bandwidth paths of the smallest number of hops). Each router also maintains a routing or topology graph that includes the state information about adjacent links and the LRTs reported by its neighbors. Each router computes its LRT for a given type of service based on the link and node information available in its topology graph.

A router reports changes to any of its LRTs to all its neighbors incrementally or atomically. The rules used to decide when a router should communicate changes to the state of a node or link can be based on optimum routing or least overhead routing approaches. The aggregation of adjacent links and routing trees reported by neighbors then constitutes the partial topology known by a router. To minimize the number of times the state of a link is communicated to neighbors, a router may assign a type vector to each link, with each bit of the vector indicating in which LRT the link is being used by the router.

AIR does not require backbones, the dissemination of complete cluster topology within a cluster, or the dissemination of the complete inter-cluster connectivity among clusters. Furthermore, AIR can be used with distributed hierarchical routing schemes proposed in the past for either distance-vector or link-state routing. See, e.g., L. Kleinrock and F. Kamoun, "Hierarchical Routing for Large Networks: Performance Evaluation and Optimization," Computer Networks, Vol. 1, pp. 155–174, 1977; M. Steenstrup (ed.), Routing in Communication Networks, Prentice-Hall, 1995; S. Murthy and J. J. Garcia-Luna-Aceves, "Loop-Free Internet Routing Using Hierarchical Routing Trees," Proc. IEEE INFOCOM 97, Kobe, Japan, Apr. 7–11, 1997; and J. Behrens and J. J. Garcia-Luna-Aceves, "Hierarchical Routing Using Link Vectors," Proc. IEEE INFOCOM 98, San Francisco, Calif., Mar. 29–Apr. 2, 1998.

A router chooses its preferred paths for a given type of service using a local path-selection algorithm. One preferred path-selection algorithm for use according to the present scheme is a modification of the shortest-path first (SPF) algorithm. The result of running the path-selection algorithm over the topology graph is an LRT for a given type of service that specifies, for each node in the LRT: the address of the head of the link incident to the node, the state parameters of the link, the state parameters of the node, and the LLID assigned to the link by the head of the link. Of course, other path selection algorithms may be used to provide similar outputs.

From its LRT, a router can compute a source route to a given destination. Because links are labeled with LLIDs assigned by the head of the links, a router can uniquely specify a source route to a destination using its own address followed by a sequence of LLIDs corresponding to its preferred path to the destination, rather than as a sequence of much larger network or link-level addresses. Although source routing and the use of local link identifiers have been used independently of one another in routing and bridging protocols in the past, AIR is the first routing protocol that disseminates the LLIDs of links, thus allowing a compact specification of source routes, making much more efficient use of the available bandwidth.

The present routing scheme is thus well suited for an ad hoc network that provides a seamless extension of the Internet Protocol (IP) to the ad hoc wireless environment. AIR will be described in terms of its operation in internet radios or IRs, which are wireless routers. However, it will be evident to those of ordinary skill in the art that AIR applies to computer networks and inter-networks that need not be based on wireless links for router interconnection. FIG. 1 illustrates aspects of an exemplary ad hoc internet that will assist in understanding the remaining discussion.

Ad hoc network 10 may be considered as a number of sub-networks 12a, 12b, 12c, which provide an extension of the Internet 14 through a number of Internet Radios or IRs 16a–16i. Each IR 16a–16i is a wireless router with an assigned IP address and a medium access control (MAC) address. In general, IRs 16a-16i operate over one or a multiplicity of radio channels using spread-spectrum wireless communication techniques common in the art. For example, the IRs 16a–16i may operate in one of the unregulated UHF frequency bands, thereby obviating the need for operating licenses. Coupling of ad hoc network 10 to the Internet 14 is achieved through a router 18, which may be operated by an Internet Service Provider (ISP). As shown, a single ISP may operate a LAN 20 to which multiple IRs are connected. In such a scheme, IRs 16a and 16b may act as "AirHeads", providing gateway service to Internet 14 via router 18. Some IRs, e.g., IRs 16d and 16e of FIG. 1, may be associated with hosts, 22a, 22b and 22c, which can be accessed by any Internet user through ad hoc network 10. Like any router, each IR 16a–16i processes all messages, changes in the cost of an adjacent link, adjacent-link failures, and new-neighbor notifications one at a time and in the order in which it detects them.

Any IR 16a–16i in FIG. 1 can consider another IR to be adjacent (we call such an IR a "neighbor") if there is radio connectivity between the two IRs and one IR, e.g., IR 16g, can receive and acknowledge packets from the other IR, e.g., IR 16h. Accordingly, a physical broadcast link connecting multiple IRs is mapped into multiple point-to-point bidirectional links defined for the same IRs. Each pair of adjacent IRs defines two point-to-point bidirectional links between them, one in each direction. Each point-to-point bidirectional link has a head node of the link and a tail node of the link.

The present routing scheme can be brought to practice together with the methods described in co-pending application Ser. No. 09/248,738, entitled "Adaptive Communication protocol for Wireless Networks," filed Feb. 10, 1999, and assigned to the Assignee of the present invention, incorporated herein by reference, for the assignment of logical link identifiers by one node to each of its one-hop neighbors. However, it will be evident to those of ordinary skill in the art that the present scheme can make use of any link-level service that enables a router to use a local identifier for each of its one-hop neighbors. The description of the present routing scheme thus assumes the existence of local identifiers for the links between a router and its immediate neighbors.

An underlying protocol, the above-noted neighbor protocol, assures that each IR 16a–16i detects within a finite time the existence of a new neighbor IR and the loss of connectivity with a neighbor IR. The neighbor protocol assumed in the present scheme can be brought to practice using link-layer retransmission strategies common in the art.

I. AIR Operation

In AIR, each IR reports to its neighbors the characteristics of every link and IR it uses to reach a destination in the ad hoc network. The set of links and IRs used by an IR in its preferred path to destinations is called the LRT of the IR. If multiple types of service (TOS) are defined in the network, an IR maintains one LRT per TOS. An IR therefore knows its adjacent links and the LRTs reported by its neighbors for each TOS, and the aggregation of an IR's adjacent links and the LRTs reported by its neighbors constitutes a partial topology graph. The links in the LRT and topology graph should be adjacent links or links reported by at least one neighbor. An IR may use the topology graph to generate its own LRT for each TOS. Each IR derives its LRT and routing table specifying the successor to each destination for each TOS by running a local path-selection algorithm for each TOS on its topology graph.

An IR communicates the updates it makes to its routing tree for any TOS. Because each IR communicates its routing tree for each TOS to its neighbors, the deletion of a link no longer used to reach a destination for a given TOS is implicit with the addition of the new link used to reach the destination and need not be sent explicitly as an update; an IR makes explicit reference to a failed link only when the deletion of a link causes the IR to have no paths to one or more destinations, in which case the IR cannot provide new links to make the deletion of the failed link implicit.

The basic update unit used in AIR to communicate changes to routing trees is the routing-state update (RSU), which describes the state of a link and the node at the end of the link. The head node of a link is the only IR that can report changes in the parameters of that link. RSUs are validated using sequence numbers, and each IR erases a link from its topology graph if the link is not present in the routing trees of any of its neighbors.

The operation of AIR can be described formally by pseudocode. As with any such description, however, there are various equivalent formulations that, upon review of the code provided, will be evident as being equivalent thereto to someone of ordinary skill in the art. The pseudocode description is set forth at the end of this detailed description, and the following variables and expressions are used therein:

T: a constant defining the number of Types of Service (TOS) in the network

Delta[T]: Delta [0], Delta [1], . . . , Delta [T–1] is a vector corresponding to thresholds to changes in the cost of a path to a destination for a given TOS.

AGEOUT_INTERVAL: a constant defining the time a failed link stays in the Topology Graph before being aged-out ORA: a constant, TRUE if AIR is running under the Optimum Routing Approach LORA: a constant, TRUE if AIR is running under the Least Overhead Routing Approach $TG_i$: Topology Graph at router i $LRT_i$: Current Labeled Routing Tree at router i $LRT_i'$: Labeled Routing Tree created the last time an update message was generated by i $N_i$: set of neighbors of router i $NS_i$: set to TRUE if i has not sent its Labeled Routing Tree to a neighbor $M_i$: set to TRUE if i must report changes to the Labeled Routing Tree $T_i$: system time used to generate time stamps to $RSU_s$ (u, v, llid, t; l[T], {n}, tos[T], del): An entry for link (u, v) in $TG_i$, $LRT_1$, $TG^i_k$, and $LRT^i_k$, where k∈$N_i$ and {l}= {llid, l[T], tos[T], del}.

u: Network address of the head of the link v: Network address of the tail of the link llid: Local link identifier t: timestamp l[T]: l[0], l[1], . . . , l[T–1] is a vector corresponding to the performance parameters of the link. The parameter l[0] corresponds to the cost of the link, the remaining parameters may be delay, bandwidth, and reliability of the link, etc.

{n}: The state parameters of router v tos[T]: tos[0], tos[1], . . . , tos[T–1] is the Type of Service bit-vector. A bit x is set to 1 when the link is added to the Labeled Routing Tree with TOS x.

del: Set to TRUE if the link cannot be used in the computation of the Labeled Routing Trees $(d[T], pred[T], suc[T], d'[T], d"[T], suc'[T], nbr)$: Variables assigned to a vertex v in $TG_i$, $LRT_i$, $TG^i_k$, and $LRT^i_k$, where $k \in N_i$ $d[T]$: Cost of the path $i \to v$ in Labeled Routing Tree x; $\forall x \in [0; T-1]$ $pred[T]$: Predecessor (link) of vertex v in Labeled Routing Tree x; $\forall x \in [0; T-1]$ $suc[T]$: Next-hop towards vertex v in Labeled Routing Tree x; $\forall x \in [0; T-1]$ $d'[T]$: Previous distance to v reported by $suc'[T]$ $d"[T]$: Cost of the path $i \to v$ the last time the cost of the path changed by $\Delta[T]$ $suc'[T]$: Previous successor towards v in Labeled Routing Tree x; $\forall x \in [0; T-0\ 1]$ nbr: Set to i if the cost of the path to v has increased but no update message must be generated $(u, v, llid, t, l[T], \{n\}, tos[T])$: Entry in an update message (RSU)

u: Network address of the head of the link v: Network address of the tail of the link llid: Local link identifier t: Time stamp assigned to RSU $l[T]$: Vector corresponding to the performance parameters of the link $\{n\}$: The state parameters of router v $tos[T]$: Type of Service bit-vector The pseudocode specifies the main procedures of AIR used to update the routing table and the link-state database at a router i for both an Optimum Routing Approach (ORA) and a Least Overhead Routing Approach (LORA). Procedure NodeUp is executed when a router i starts up. The neighbor set of the router is empty initially.

If the neighbor protocol reports a new link to a neighbor k (procedure {\em NeighborUp), the router then runs Update with the appropriate message as input; the RSU in the message gets a current time stamp. The same approach is used for link failures (NeighborDown) and changes in the parameters of a link (LinkChange). When a router establishes connectivity to a new neighbor, the router sends its complete labeled routing tree to the neighbor (much like a distance vector protocol sends its complete routing table). The RSUs that are to be broadcast to all neighbors are inserted into $MSG_i$.

The procedure Update is executed when router i receives an update message from neighbor k or when the parameters of an outgoing link have changed. First, the topology graphs $TG_i$ and $TG^i_k$ are updated, then the labeled routing trees $LRT^i_k$ and $LRT_i$ are updated, which may cause the router to update its routing table and to send its own update message.

The state of a link in the topology graph $TG_i$ is updated with the new parameters for the link if the routing-state update in the received message is valid, i.e., if the RSU has a larger time stamp than the time stamp of the link stored in $TG_i$.

The parameters of a link in $TG^i_k$ are always updated when processing an RSU sent by a neighbor k, even if the link-state information is outdated, because they report changes to the labeled routing tree of the neighbor. A node in a labeled routing tree $LRT^i_k$ for a given TOS can have only one link incident to it. Hence, when i receives an RSU for link (u,v) from k the current incident link (u', v) to v, $u \neq u'$, is deleted from $TG^i_k$.

The information of an RSU reporting the failure of a link is discarded if the link is not in the topology graph of the router.

A shortest-path algorithm (SPF) based on Dijkstra's SPF (procedure BuildShortestPathTree) is run on the updated topology graph $TG^i_k$ to construct a new labeled routing tree $LRT^i_k$, and then run on the topology graph $TG_i$ to construct a new labeled routing tree $LRT_i$.

The incident link to a node v in router's i new labeled routing tree is different from the link in the current labeled routing tree $LRT_i$ only if the cost of the path to v has decreased or if the incident link in $LRT_i$ was deleted from the labeled routing trees of all neighbors.

A new labeled routing tree newLRT for a neighbor k, including the router's new labeled routing tree, is then compared to the current labeled routing tree $LRT^i_k$ (procedure UpdateNeighborTree), and the links that are in $LRT^i_k$ but not in newLRT are deleted from $TG^i_k$. After deleting a link (u, v) from $TG^i_k$ the router sets $TG_i(u, v).del$ to TRUE if the link is not present in the topology graphs $TG^i_x$, $\forall x \in N_i$.

If a destination v becomes unreachable, i.e., there is no path to v in the new labeled routing tree newLRT, then RSUs will be broadcast to the neighbors for each link in the topology graph $TG_i$ that have v as the tail node of the link and a link cost infinity.

This specification assumes that the Link Layer provides reliable broadcast of network-level packets and consequently update messages specify only incremental changes to the router's labeled routing tree instead of the complete labeled routing tree.

The new router's labeled routing tree newLRT is compared to the last reported labeled routing tree ($\{LRT_i\}'$ for LORA and $LRT_i$ for ORA) (procedure ReportChanges), and an update message that will be broadcast to the neighbors is constructed from the differences of the two trees. An RSU is generated if the link is in the new labeled routing tree but not in the current labeled routing tree, or if the parameters of the link have changed. For the case of a router running LORA, the labeled routing trees are only compared with each other if at least one of the four rules described in section V, below, is met, i.e., $M_i$=TRUE.

If the new router's labeled routing tree was compared against the last reported labeled routing tree then the router removes from the topology graph all the links that are no longer used by any neighbor in their labeled routing trees (failed links are only removed from the topology graph by agine).

Finally, the current shortest-path tree $LRT^i_k$ is discarded and the new one becomes the current labeled routing tree. The router's labeled routing tree is then used to compute the new routing table, using for example a depth-first search in the shortest-path tree.

II. Information Exchanged in AIR

Prior routing protocols based on topology information or distance information are based on the parameters of links exclusively. In contrast, AIR uses an update unit that conveys information about the performance characteristics and addressing information for a link and the node at the end of the link. More specifically, an RSU includes the following elements:

a) A time stamp that validates the RSU;
b) A type-of-service vector;
c) The network address of the head node of the link;

d) The network address of the tail node of the link;
e) The link state parameters of the link between the two IRs; and
f) The node state parameters of the tail of the link.

An update message sent by an IR contains at least one RSU. The time stamp of the RSU is assigned by the head of the link and should not be altered by any other node relaying the RSU in an update message. The type-of-service (TOS) vector is a bit vector specifying the TOS routing tree in which the link is being used by the node sending the RSU. The state parameters of a link are specified as a list of tuples, with each tuple consisting of a type and a content. There are two classes of state parameters for a link: performance parameters and addressing parameters. The performance of a link can be characterized in terms of its delay, cost, bandwidth, and reliability, for example. An addressing parameter specifies an identifier assigned to the link. An example of such an identifier in the present scheme is the local link identifier (LLID) assigned to the link by the head of the link. The state parameters of the tail of a link may include, for example, the remaining battery life of the node.

III. Information Stored in AIR

Figure 2C:
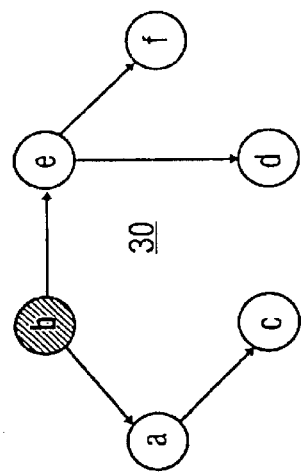
FIGS. 2a–2d illustrate an example of a six-node wireless network with routers configured in accordance with the present routing protocol and the labeled routing trees developed at various ones of the routers.
Figure 2B:
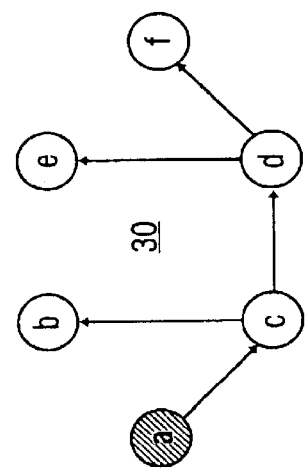
Figure 2A:
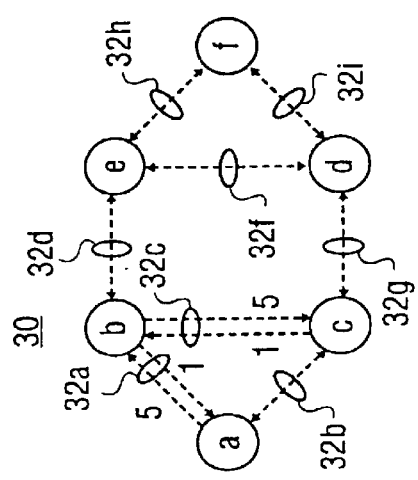
Figure 2D:
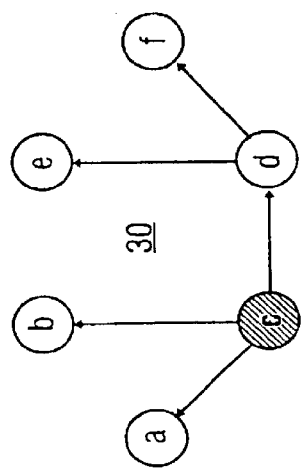

FIGS. 2a–2d illustrate the fact that IRs running AIR need maintain only partial topology information. These illustrations provide an example of a six-node wireless network (each node labeled a–f, respectively). For simplicity, these Figures assume that a single link parameter is used to characterize a link in one of its directions, called the "cost" of the directed link. For example, link 32c may have a cost of 5 in the direction b to c, but only a cost of 1 in the direction c to b. In other examples, nodes may be coupled by multiple links between them, each having the same or different costs. FIGS. 2b through 2d show the selected topology according to AIR at the IRs indicated with filled circles. Solid lines represent the links that are part of the labeled routing tree of the respective IR. Arrowheads on links indicate the direction of the link stored in the IR's topology graph. IR a's labeled routing tree shown in FIG. 2b is formed by the labeled routing trees reported by its neighbors b and c, and the links for which IR a is the head node (namely links (a, b) and (a, c)). Similarly, FIG. 2c shows the LRT for IR b and FIG. 2d that for IR c. From the figures, the savings in storage requirements should be clear, even for this few-node network.

The information maintained by an IR to participate in AIR includes a topology graph, an LRT for each TOS defined in the network, a routing table, and an adjacent-link table. The record entry for the link from u to v in the topology graph consists of the tuple (u, v, t, {l}, {n}), where u and v are the network addresses of the head and tail of the link, respectively, t is the most recent time stamp received for link (u, v), {L} is a sequence of type-value pairs specifying link parameters, and {n} is a sequence of type-value pairs specifying node parameters. A link parameter used in the present scheme is the LLID of the link.

The routing table specifies, for each destination and for each TOS, the next IR in the path to the destination and the distance to that destination based on the distance metric used for the TOS.

The cost of a failed link is considered to be infinity for any TOS. There are various ways in which costs may be assigned to links for a given TOS known in the art. For example, the cost of a link could simply be the number of hops, or the addition of the latency over the link plus some constant bias.

IV. Validating Updates

Because of delays in the IRs and links of an internetwork, update messages sent by a IR may propagate at different speeds along different paths. Therefore, a given IR may receive an RSU from a neighbor with stale link-state information, and a distributed termination-detection mechanism is necessary for a IR to ascertain when a given RSU is valid and avoid the possibility of RSUs circulating forever. AIR uses time stamp to validate RSUs. An IR either maintains a clock that does not reset when the IR stops operating, or asks its neighbors for the oldest known time stamp after if initializes or reboots.

An IR receiving an RSU accepts the RSU as valid if the received RSU has a larger time stamp than the time stammp of the RSU stored from the same source, or if there is no entry for the link in the topology graph and the RSU is not reporting an infinite cost. Link-state information for failed links are the only RSUs erased from the topology graph due to aging (which may be on the order of an hour or so (or other time period) after having processed the RSU). RSUs for operational links are erased from the topology graph when the links are erased from the routing trees of all the neighbors.

It is noted that, because RSUs for operational links never age out, there is no need for the head node of a link to send periodic RSUs to update the time stamp of the link. This is important, because it means that AIR does not need periodic update messages to validate link-state information like OSPF, J. Moy, "OSPF Version 2," RFC 1583, Network Working Group, March 1994, and all prior protocols based on sequence numbers or time stamps.

V. Exchanging Update Messages

An IR sends RSUs in two different ways: (a) Following an optimum routing approach; and (b) following a least overhead approach. The optimum routing approach is well suited for networks with fairly static topologies. The least overhead approach is tailored for networks with dynamic topologies due to IR mobility. Which approach should be executed in IRs can be defined by an IR configuration parameter.

As indicated in the pseudocode description, according to the optimum routing approach an IR sends RSUs about a link in the following cases: (a) when an RSU is received for the link causing the link to be added to the IR's routing tree, (b) when the link is already in the IR's routing tree and a more recent RSU is received for the link, (c) when an RSU reporting the failure of the link results in no path to the tail of the link, and (d) when a failed link is not in the IR's routing tree and there is no path to the tail of the link.

In contrast, according to the least overhead approach an IR sends RSUs according to the following rules:

(a) The IR finds a new destination, or any of its neighbors reports a new destination.
(b) The IR finds that the change in the cost of a path to at least one distination exceeds a threshold delta, or at least one destination becomes unreachable to the IR or any of its neighbors.
(c) A path implied in the LRT of the IR leads to a loop.
(d) The IR sends an RSU when: (i) The new successor chosen to a given destination has an address larger than the address of the IR; and (ii) the reported distance from the new chosen successor n to a destination j is longer than the reported distance from the previous successor to the same destination. However, if the link from the IR to j fails and n is a neighbor of j, no update message is needed regarding j or any destination whose path from the IR involves j.

Each time an IR processes an update message from a neighbor, it updates that neighbor's LRT and traverses that tree to determine for which destinations its neighbor uses the IR as a relay in its preferred paths. The IR then determines if it is using the same neighbor as a relay for any of the same destinations. A routing loop is detected if the IR and neighbor use each other as relay to any destination, in which case the loop must be broken and the IR must send an update message with the corresponding changes.

We observe that, in any routing loop among IRs with unique addresses, one of the IRs must have the smallest address in the loop; therefore, if an IR is forced to send an update message when it chooses a successor whose address is larger than its own, then it is not possible for all IRs in a routing loop to remain quiet after choosing one another, because at least one of them is forced to send an update message, which causes the loop to break when IRs update their LRTs.

To ensure that AIR works correctly with least overhead routing and incremental updates specifying only changes to an LRT, an IR must remember the LRT that was last notified to its neighbors. If any of the rules for update notification in least overhead routing are satisfied, the IR must do one of two things: (a) If the LRT includes new neighbors than those present in the LRT that was last updated, then the IR must send its entire LRT in its update, so that new neighbors learn about all the destinations the IR knows; (b) if the two LRTs imply the same neighbors, the IR sends only the updates needed to obtain the new LRT from the old one.

To ensure that AIR stops sending update messages, a simple rule can be used to determine which IR must stop using its neighbor as a relay, such a rule can be, for example, "the IR with the smaller address must change its path."

The rules for update-message exchange according to least overhead routing stated above assume that an update message is sent reliably to all the neighbors of an IR. The following example illustrates a scenario in which the last rule is needed to prevent permanent loops. Consider the six-node wireless network 30 shown in FIG. 2a. In this example, IRs are given identifiers that are lexicographically ordered, i.e., "a" is the smallest identifier and "f" is the largest identifier in the graph. All links and nodes are assumed to have the same propagation delays, all the links but links (a, b) and (b, c) have unit cost, and delta=∞. FIGS. 2b through 2d show the LRTs according to AIR at the IRs indicated with filled circles for the network topology depicted in FIG. 2a. Arrowheads on solid lines indicate the direction of the links stored in the IR's LRT.

FIGS. 3a–3f now depict the sequence of events triggered by the execution of AIR in the example network after the failures of links (c, d) 32g and (b, e) 32d. The figures show the RSUs (in parentheses) generated by the node with filled circle, which RSUs are transmitted in an update message to the node's neighbors. The third element in an RSU corresponds to the cost of the link (a RESET has cost infinity). As shown in FIG. 3b, node c transmits an RSU after processing the failure of link (c, d) 32g; the distance from the new successor b to d and f is longer than from the previous successor d. When link (b, e) 32d fails (see FIG. 3d), node b realizes that the destinations d, e, and f are unreachable and generates an RSU reporting the failure of the link connecting to the head of the subtree of the LRT that becomes unreachable. The RSU from b triggers the RSUs that allow nodes a, b, and c to realize that there are no paths to d, e, and f (FIGS. 3e and 3f). A similar sequence of events takes place at the other side of the network partition (not shown).

Figure 4A:
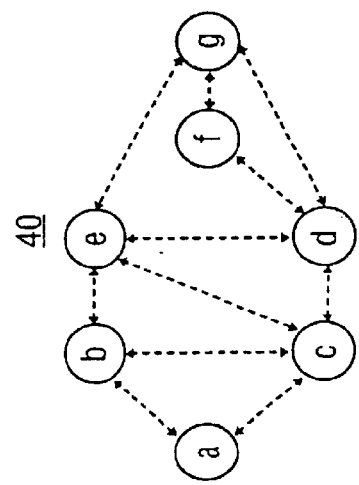
FIGS. 4a–4f illustrate an example of how a link failure within a wireless network made up of a number of routers configured in accordance with the present routing protocol may not lead to the generation of new update messages by such routers when all such routers still have a path to all available destinations in the network.
Figure 4B:
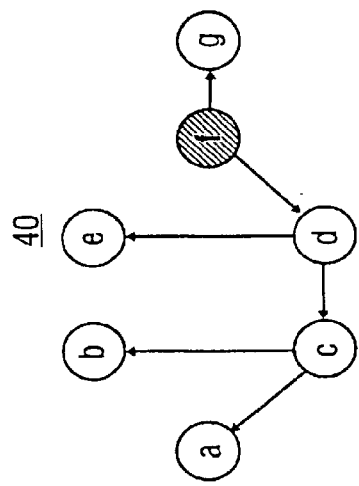
Figure 4C:
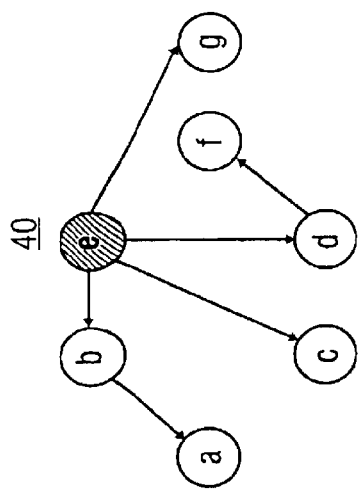
Figure 4D:
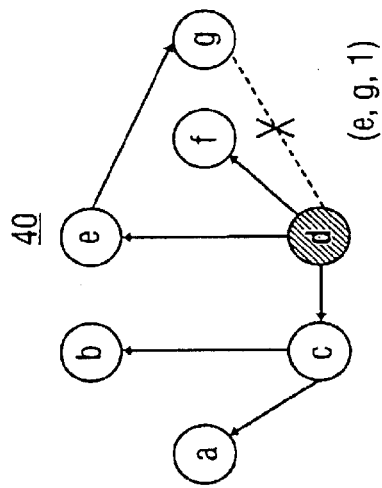
Figure 4E:
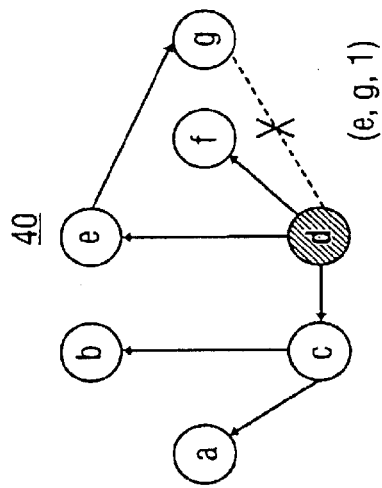
Figure 4F:
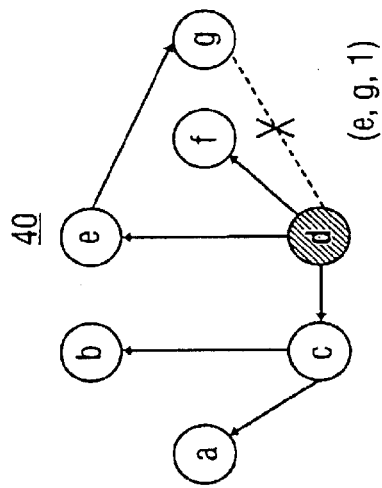

As another example of the operation of AIR, consider the seven-node wireless network 40 shown in FIG. 4a. All links and nodes are assumed to have the same propagation delays, all the links have unit cost, delta=∞. FIGS. 4b through 4d show the LRTs produced according to AIR at the IRs indicated with filled circles for the network topology depicted in FIG. 4a. Arrowheads on solid lines indicate the direction of the links stored in the IR's LRT. When the link (f, g) fails (FIG. 4e), the neighbor protocol at node f triggers the execution of procedure NeighborDown, the link (d, g) is inserted into f's LRT but no update message is generated because f's new successor towards g has an address smaller than f and destination g is a neighbor of the new successor. FIG. 4f shows the new LRT of node d after the failure of link (d, g). Because d has an address smaller than the new successor towards g it is required to send an update message reporting the new link added to the LRT. Nodes c, e, and f do not generate any update message after processing d's message because there exist a path to all destinations in the network and no routing loop was formed. This example thus illustrates how link failures may not cause the generation of update messages by nodes that have the failed link in their LRTs as long as the nodes have a path to all destinations.

VI. Obtaining LRTs and Source Routes

Obtaining the LRTs and source routes in the present scheme is done with a very simple modification to Dijkstra's SPF algorithm that is run on the topology graph of an IR. The modifications to SPF consist of checking for the proper bit to be set in the TOS bit vector of a link so that only those links being used for the required TOS are considered in preferred paths, and accumulating the source route in terms of LLIDs as the topology graph is traversed.

Given the topology graph, the algorithm proceeds as follows:

1. Initialize:
    Value of TOS bit vector=T
    Set IR-set={root}, where root is the IR running the algorithm.
    Dist-to-root=0
    Route-to-root=root
    for all IRs other than root set
        Dist-to-IR=infinity
        Route-to-IR=root
    for all IRs neighbors of root
        If TOS bit vector=T then
            Dist-to-IR=cost of link to IR
            Route-to-IR=Route-to-IR U LLID of link to IR
2. Find next IR in IR-set:
    Find an IR x not in set such that:
    Dist-to-IR=Minimum{Dist-to-IR not in IR-set considering only links with TOS bit vector=T}
    Augment IR-set=IR-set U x
    Stop if IR-set contains all IRs
3. Change chosen distance and path:
    For each IR y not in IR-set do:
    Dist-to-y=Minimum{Dist-to-y, Dist-to-z+cost of link (z,y) with z in IR-set and TOS bit vector of (z,y)=T}
    Route-to-y=Route-to-z U LLID of (z,y)
4. Repeat Step 2.

Thus a scheme for enabling routing of data packets in a computer network has been described. Although the foregoing description and accompanying figures discuss and illustrate specific embodiments, it should be appreciated that the present invention is to be measured only in terms of the claims that follow the example of a pseudocode listing for the routing protocol set forth below:

```
NodeUp( )
description
     Node i initializes itself
{
     $TG_2 \leftarrow \emptyset$;
     $LRT_i \leftarrow \emptyset$;
     $LRT_i^1 \leftarrow \emptyset$;
     $M_i \leftarrow$ FALSE;
     $NS_i \leftarrow$ FALSE;
}
NeighborUp(k,llid,l[T],{n})
description
     Neighbor protocol reports connectivity to neighbor k
{
     $N_i \leftarrow N_i \cup \{k\}$;
     $TG_k^i \leftarrow \emptyset$;
     $LRT_k^i \leftarrow \emptyset$;
     sendLRT $\leftarrow$ TRUE;
     tos[x] $\leftarrow 0, \forall x \in [0,T-1]$;
     if (LORA and $k \in TG_i$ and $TG_i(k).pred[0] \neq$ null)
     {
          $NS_i \leftarrow$ TRUE;
          sendLRT $\leftarrow$ FALSE;
     }
     Update(i, (i,k,llid,$T_i$,l[T], {n}, tos[T]));
     if (sendLRT)
     {
          $MSG_i \leftarrow \emptyset$;
          for each (link (u,v) $\in LRT_i$)
               $MSG_i \leftarrow MSG_2 \cup \{(u,v,TG_i(u,v).llid,TG_i(u,v).t,$
                    $TG_i(u,v).l[T],TG_i(u,v).\{n\},TG_i(u,v).tos[T])\}$;
     }
     Send( );
}
NeighborDown(k,llid)
description
     Neighbor protocol reports link failure to neighbor k
{
     $N_i \leftarrow N_i - \{k\}$;
     $TG_k^i \leftarrow \emptyset$;
     $LRT_k^i \leftarrow \emptyset$;
     l[x] $\leftarrow \infty, \forall x \in [0,T-1]$;
     tos[x] $\leftarrow 0, \forall x \in [0,T-1]$;
     Update(i, (i,k,llid,$T_i$,l[T],$\emptyset$,tos[T]));
     Send( );
}
LinkChange(k,llid,l[T], {n})
description
     Neighbor protocol reports link cost change to neighbor k
{
     Update(i,(i,k,llid,$T_i$,l[T], }n$\equiv$, $TG_i(i,k).tos[T])$);
     Send( );
}
Update(k,msg)
description
     Process update message msg sent by router k
{
     newLRTi $\leftarrow \emptyset$;
     newLRTk $\leftarrow \emptyset$;
     UpdateTopologyGraph(k,msg);
     for each (x $\in [0,T-1]$)
          ComputeLabeled RoutingTreeTOS$_x$(k, newLRTi, newLRTk);
     if (k $\neq$ i)
     {
          UpdateNeighborTree(k, newLRTk);
          $LRT_k^i \leftarrow$ newLRTk;
          newLRTk $\leftarrow \emptyset$;
     }
     UpdateNeighborTree(i,newLRTi);
     if (LORA and $M_i$)
     {
          ReportChanges($LRT_i^1$,newLRTi);
          $LRT_i^1 \leftarrow$ newLRTi;
          $NS_i \leftarrow$ FALSE;
     }
     else if (ORA)
          ReportChanges($LRT_i$, newLRTi);
     if (ORA or (LORA and $M_i$))
          for each (link (u,v) $\in TG_i | TG_i(u,v).$del = TRUE)
```

```
            TG_i ← TG_i - {(u,v)};
    M_i ← FALSE;
    LRT_i ← newLRT_i;
    newLRT_i ← ∅;
    UpdateRoutingTable( )
    if (k ≠ i)
            Send( );
}
UpdateTopologyGraph(k,msg)
description
    Update TG_i and TG_k^i from RSUs in msg
{
    for each (RSU (u,v,llid,t,l[T], {n}, tos[T]) ∈ msg)
    {
        if (l[0] ≠ ∞)
            ProcessAddUpdate(k,(u,v,llid,t,l[T],{n},tos[T]));
        else
            ProcessVoidUpdate(k,(u,v,llid,t,l[T],{n},tos[T]));
    }
}
Send( )
{
    if (MSG_i ≠ ∅)
        Broadcast message MSG_i;
    MSG_i ← ∅;
}
ProcessAddUpdate(k,(u,v,llid,t,l[T],{n},tos[T]))
description
    Update topology graphs TG_i and TG_k^i from RSU (u,v,llid,t,l[T],{n},tos[T])
{
    if ( (u,v) ∉ TG_i or t > TG_i(u,v).t)
    {
        if ( (u,v) ∉ TG_i )
            TG_i ← TG_i ∪ {(u,v,llid,t,l[T], {n},tos[T])};
        else
        {
            if ( TG_i(u,v).l[0] = ∞ )
                Link (u,v) is no longer scheduled to age-out;
            TG_i(u, v).llid ← llid;
            TG_i(u,v).t ← t;
            TG_i(u,v).l[T] ← l[T];
            TG_i(u,v).{n} ← }n};
        }
    }
    if (k ≠ i)
    {
        for each (link (r,s) ∈ TG_k^i | r ≠ and s = v)
        {
            TG_k^i(r,s).tos[T] ← ^ TG_k^i(r,s).tos[T]    (TG_k^i(r,s).tos[T] ^ tos[T]);
            if ( TG_k^i(r,s).tos[x] = 0, { x ∈ [0, T - 1] )
                TG_k^i ← TG_k^i - {(r,s)};
        }
        if ( (u, v) ∉ TG_k^i )
            TG_k^i ← TG_k^i ∪ {(u,v,llid,t,l[T],{n},tos[T])};
        else
        {
            TG_k^i(u,v).llid ← llid;
            TG_k^i(u,v).t ← t;
            TG_k^i(u,v).l[T] ← l[T];
            TG_k^i(u,v).{n} ← {n};
            TG_k^i(u,v).tos[T] ← tos[T];
        }
    }
    TG_i(u, v).del ← FALSE;
}
ProcessVoidUpdate(k,(u,v,llid,t,l[T],{n},tos[T]))
description
    Update topology graphs TG_i and TG_k^i from RSU
    (u,v,llid,t,l[T],{n},tos[T]) reporting link failure
{
    if ( (u,v) ∉ TG_i)
    {
        if (t > TG_i(u,v).t)
        {
            TG_i(u,v).llid ← llid;
            TG_i(u,v).t ← t;
            TG_i(u,v).l[T] ← l[T];
            TG_i(u,v).{n} ← {n};
            Schedule link (u,v) to age-out in AGEOUT_NTERVAL seconds.
```

```
            The following operation is performed when the link (u,v)
            ages out: TG_i ← TG_i - {(u,v)};
        }
        if (k ≠ i and (u,v) ∈ TG_k^i)
        {
            TG_k^i(u,v).llid ← llid;
            TG_k^i(u,v).t ← t;
            TG_k^i(u,v).l[T] ← l[T];
            TG_k^i(u,v).{n} ← {n};
            TG_k^i(u,v).tos[T] ← tos[T];
        }
        TG_i(u,v).del ← FALSE;
    }
}
ComputeLabeled RoutingTreeTOS_0(k,newLRTi,newLRTk)
{
    if (k ≠ i)
        BuildShortestPathTree(k,newLRTk);
    BuildShortestPathTree(i,newLRTi);
}
BuildShortestPathTree(k,newLRT)
description
    Construct LRT_k^i;
{
    InitializeSingleLabeled Routing(k);
    Q ← set of vertices in TG_k^i;
    u ← ExtractMin(Q);
    while (u ≠ null and TG_k^i(u).d[0] < ∞)
    {
        if (TG_k^i(u).pred[0] ≠ null and NOT TG_k^i(u).pred[0].tos[0])
        {
            (r,s) ← TG_k^i(u).pred[0];
            if ( (r,s) ∉ newLRT )
            TG_k^i(r,s).tos,[0] ∈ 1;
                newLRT ← newLRT ∪ (r,s);
            newLRT(r,s).tos[0] ← 1;
            if ( LORA and k = i)
            {
                if (i > TG_i(u).suc[0])
                    if (∃ x ∈ N_i | TG_x^i (u).suc[0] = i and TG_i(u).suc[0] = x)
                        M_i ← TRUE; // LORA-3 rule
                if (TG_i(u).suc[0] ≠ TG_2(u) .suc'[0] and TG_i(u).suc[0] > i)
                    M_i ← TRUE; // LORA-3 rule
                if (**(x,y) ∈ LRT_i^1 | y = u and LRT_i^1(x,y).tos[0])
                    M_i ← TRUE; // LORA-1 rule
                if( | TG_i(u).d[0]-TG_i(u).d"[0] | > Δ)
                {
                    M_2 ← TRUE; // LORA-2 rule
                    TG_i(u).d"[0] ← TG_i(u).d[0];
                }
                w ← TG_i(u).suc[0];
                if (w ≠ i)
                    path_w_u_cost ← TG_i(u).d'[0]-TG_i(i,w).l[0];
                else
                    path_w_u_cost ← 0;
                if (path_w_u_cost > TG_i(u).d'[0])
                {
                    if (r = w or TG_i(r).nbr = i)
                        TG_i(s).nbr ← i;
                    if (TG_i(s).nbr ≠ i)
                        M_i ← TRUE; // LORA-3 rule
                }
                TG_i(u).d'[0] ← path_w_u_cost;
                TG_i(u).suc'[0] ← TG_i(u).suc[0];
            }
        }
        for each (vertex v ∈ adjacency list of TG_k^i (u))
        {
            TG_k^i(u,v).tos[0] ← 0;
            if (TG^ki(u,v).l[0] ≠ ° and NOT TG_i(u,v).del)
            {
                if (k = i)
                {
                    if (u = i)
                        suc ← i;
                    else if (TG_i(u).suc[0] = i)
                        suc ← {x | x ∈ N_i and x = u};
                    else
                        suc ← TG_i(u).suc[0];
```

```
            }
            else
            {
                if (u = k)
                    if(v = i) suc ← i;
                    else suc ← k;
                else
                    suc ← TG_i(u).suc[0];
            }
            RelaxEdge(k,u,v,Q,suc);
        }
    }
    if (Q ≠ 0)    u ← ExtractMin(Q);
    else          u ← null;
    }
}
InitializeSingleLabeled Routing(k)
{
    for each (vertex v ∈ TG_k^i)
    {
        TG_k^i(v).d[0] ← ∞;
        TG_k^i(v).pred[0] ← null;
        TG_k^i(v).sud'[0] ← TG_k^i(v).suc[0];
        TG_k^i(v).suc[0] ← null;
        TG_k^i(v).nbr[0] ← null;
    }
    TG_k^i(k).d[0] ← 0;
}
RelaxEdge(k,u,v,Q,suc)
{
    if(TG_k^i(v).d[0] > TG_k^i(u).d[0] + TG_k^i(u,v).l[0] or
       (k = i and TG_k^i(v).d[0] = TG_k^i(u).d[0] + TG_k^i(u,v).l[0] and
        (u,v) ∈ LRT_i and LRT_i(u,v).tos[0]))
    {
        TG_k^i(v).d[0] ← TG_k^i(u).d[0] +TG_k^i(u,v).l[0];
        TG_k^i(v).pred[0] ← TG_k^i(u,v);
        TG_k^i(v).suc[0[ ← suc;
        if (LORA and k = i and TG_i(v).suc'[0] = null)
        {
            // v was an unknown destination
            TG_i(v).suc'[0] ← suc;
            TG_i(v).d"[0] ← TG_i(v).d[0];
            if (suc ≠ i)
                TG_i(v).d'[0] ← TG_i(v).d[0] - TG_i(i,suc).l[0];
            else
                TG_i(v).d'[0] ← ← 0;
        }
        Insert(Q,v);
    }
}
ReportChanges(oldLRT,newLRT)
description
    Generate RSUs for new links in the router's labeled routing tree
{
    for each (link (u,v) ∈ newLRT)
        if ((u,v) ∉ oldLRT or newLRT(u,v).t ≠ oldLRT(u,v).t or oldLRT(u,v).tos[T] ≠ newLRT(u,v).tos[T] or NS_i)
            MSG_i ← MSG_i ∪ {(u,v,TG_i(u,v).llid,TG_2(u,v).t, TG_i(u,v).l[T],TG_i(u,v).{n},TG_i(u,v).tos[T])};
}
UpdateNeighborTree(k,newLRT)
description
    Delete links from TG_n^i and report failed links
{
    for each (link (u,v) ∈ LRT_k^i)
    {
        if ((u,v) ∉ newLRT)
        {
            // k Has removed (u,v) from its labeled routing tree
            if (LORA and (TG_k^i(v).pred[x] = null, ∀ x ∈ [0,T - 1]))
            {
                // LORA-2 rule: k has no path to destination v
                M_i ← TRUE;
                if (k = i)
                    for each (link (r,s) ∈ TG_i | s = v)
                        if (TG_i(r,s).l[0] = ∞)
                            MSG_i ← MSG_i ∪ {(r,s,TG_i(r,s).llid,TG_i(r,s).t,TG_i(r,s).l[T],TG_i(r,s).{n},TG_i(r,s).tos[T])};
            }
            if (ORA and k = i and (u = i or (TG_i(v).pred[x] = null, ∀ x ∈ [0,T - 1])))
            {
                // i has no path to destination v or i is the head node
```

```
            if (TG_i(v).pred[x] = null, ∀ x ∈ [0,T - 1])
                for each (link (r,s) ∈ TG_i | s = v)
                    if (TG_i(r,s).l[0] = ∞)
                        MSG_i ← MSG_i ∪ {(r,s,TG_i(r,s).llid,TG_i(r,s).t,TG_i(r,s).l[T], TG_i(r,s).{n},TG_i(r,s).tos[T])};
            else if (TG_i(u,v).l[0] = ∞)
                // i Needs to report failed link
                MSG_i ← MSG_i ∪ {(u,v,TG_i(u,v).llid,TG_i(u,v).t,TG_i(u,v).l[T],TG_i(u,v).{n},TG_i(u,v).tos[T])};
        }
        if (LORA and k = i and (TG_i(v).pred[x] = null, ∀ x ∈ [0,T - 1]))
        {
            TG_i(v).d'[x] ← ∞, ∀ x ∈ [0,T - 1];
            TG_i(v).suc'[x] ← null, ∀ x ∈ [0,T - 1];
            TG_i(v).d"[x] ← ∞ ∀ x ∈ [0,T - 1];
        }
        if (NOT (k = i and u = i))
        {
            if ((u,v) ∈ TG_k^i)
                TG_k^i ← TG_k^i - {(u,v)};
            if (TG_i(u,v).l[0] = ∞ and ∄ x ∈ N_i | (u,v) ∈ TG_x^i)
                TG_i(u,v).del ← TRUE;
        }
    }
  }
}
```

What is claimed is:

1. A method for routing information along preferred paths in a computer network in which a plurality of routers are interconnected by communication links, comprising:

forming a partial topology graph for a router by combining link-state information of each adjacent link, router-state information of each adjacent router, and link-state information and node-state information of each link adjacent to each adjacent router; and computing a plurality of labeled routing trees (LRT) for the router using only the partial topology graph, each LRT corresponding to a type of service of the computer network, each LRT specifying a preferred path from the router to each of a plurality of destination routers in the network, wherein the LRTs of the router are updated in response to receipt of routing state update messages, the routing state update messages including one or more local link identifiers, each local link identifier assigned by a head-of-link router to which the identifier pertains, and wherein the routing state update messages are transmitted within the computer network in response to at least one of: (i) a new destination router being detected by an existing router within the network, (ii) a destination router becoming unreachable by a collection of the existing routers, (iii) a change in the cost of a path to at least one destination router exceeding a threshold delta, and (iv) in situations where a routing loop may be encountered among two or more of the routers of the network.

2. The method of claim 1, wherein situations where a routing loop may be encountered include times when a path implied in the LRT of the router leads to a loop.

3. A source routing protocol, for a computer network in which a plurality of routers are interconnected by communication links, comprising distributing, among the plurality of routers of the computer network, a local link identifier corresponding to each router within routing state update messages, the routing state update messages including a link-state information and a node-state information, wherein each router maintains a plurality of labeled routing tree (LRT), each LRT corresponding to a type of service of the computer network, wherein the LRTs of routers in the computer network are updated in response to receipt of one or more routing state update messages and wherein LRTs are updated according to whether an optimum routine approach or a least overhead routing approach is used within the computer network, the optimum routing approach routing state update messages are transmitted when at least one of: (i) a routing state update message which causes a link to be added to a subject router's labeled routing trees is received, (ii) a recent routing state update message regarding an existing link in the subject router's labeled routing trees is received, and (iii) a destination becomes unreachable by the subject router.

4. A source routing protocol, for a computer network in which a plurality of routers are interconnected by communication links, comprising distributing, among the plurality of routers of the computer network, a local link identifier corresponding to each router within routing state update messages, the routing state update messages including a link-state information and a node-state information, wherein each router maintains a plurality of labeled routing tree (LRT), each LRT corresponding to a type of service of the computer network, wherein the LRTs of routers in the computer network are updated in response to receipt of one or more routing state update messages and wherein LRTs are updated according to whether an optimum routing approach or a least overhead routing approach is used within the computer network, wherein in the last overhead routing approach state update messages are transmitted: (i) when a subject router finds a new destination or any neighbors of the subject router report same, (ii) when a destination becomes unreachable by the subject router or any of its neighbors, (iii) when the subject router finds that the change in the cost of path to at least one destination exceeds a threshold delta, (iv) when a path implied in any of the labeled routing trees of the subject router leads to a loop, and/or a new successor chosen to given destination has an address larger than an address of the subject router and a reported distance from the new successor to a particular destination is larger than a reported distance from a previous successor to that particular destination.

5. A source routing protocol, for a computer network in which a plurality of routers are interconnected by communication links, comprising distributing, among the plurality of routers of the computer network, a local link identifier corresponding to each router within routing state update messages, the routing state update messages including a link-state information and a node-state information, wherein each router maintains a plurality of labeled routing tree (LRT), each LRT corresponding to a type of service of the computer network, and wherein the routing state update message includes performance characteristic information and addressing information for a link of the computer network and a tail-of-link router pertaining to the link, the routing state update message further includes a time stamp assigned by a head-of-link router, the time stamp indicating the validity of the routing state update message.

6. The source routing protocol of claim 5 wherein the performance characteristics include link-state parameters of the link.

7. The source routing protocol claim 5 of wherein the routing state update message further includes a type of service vector.

8. The source routing protocol of claim 7 wherein the type of service vector specifies a type of service routing tree in which the link is being used by a router transmitting the routing state update message.

9. The source routing protocol of claim 5 wherein the routing state update message includes addressing information for the head-of-link router.

* * * * *